US009043871B2

(12) United States Patent
Choi et al.

(10) Patent No.: US 9,043,871 B2
(45) Date of Patent: May 26, 2015

(54) METHOD FOR OPERATING INVISIBLE SYSTEM SERVICES ON ANDROID PLATFORM

(71) Applicant: Foundation of Soongsil University-Industry Cooperation, Seoul (KR)

(72) Inventors: Jaeyoung Choi, Seoul (KR); Eunhoe Kim, Seoul (KR); Sungmin Kim, Seoul (KR)

(73) Assignee: Foundation of Soongsil University-Industry Cooperation, Seoul (KR)

( * ) Notice: Subject to any disclaimer, the term of this patent is extended or adjusted under 35 U.S.C. 154(b) by 37 days.

(21) Appl. No.: 13/751,986

(22) Filed: Jan. 28, 2013

(65) Prior Publication Data
US 2014/0130123 A1    May 8, 2014

(30) Foreign Application Priority Data
Nov. 6, 2012  (KR) .................. 10-2012-0124778

(51) Int. Cl.
*G06F 21/00* (2013.01)
*G06F 21/54* (2013.01)
(52) U.S. Cl.
CPC .............. *G06F 21/00* (2013.01); *G06F 21/54* (2013.01)
(58) Field of Classification Search
USPC .............................. 726/2; 713/168
See application file for complete search history.

(56) References Cited

U.S. PATENT DOCUMENTS

| 2011/0154436 | A1* | 6/2011 | Jian et al. | 726/2 |
| 2011/0270899 | A1* | 11/2011 | Chen et al. | 707/816 |
| 2011/0302405 | A1* | 12/2011 | Marlow | 713/150 |
| 2012/0233592 | A1* | 9/2012 | Gounares | 717/114 |
| 2013/0097605 | A1* | 4/2013 | Martinka et al. | 718/100 |
| 2013/0290709 | A1* | 10/2013 | Muppidi et al. | 713/168 |

OTHER PUBLICATIONS

Bartel et al, ASE 2012 Proceedings of the 27th IEEE/ACM International Conference on Automated Software Engineering ISBN: 978-01-4503-1204-2, pp. 274-277.*
Andriatsimandefitra, R. ; Cidre Supelec/Inria, Rennes, France ; Geller, S. ; Tong, V.V.T,Designing information flow policies for Android's operating system, Communications (ICC), 2012 IEEE International Conference on, Print ISBN: 978-01-4577-2052-9 pp. 976-981.*
Bartel et al, "Automatically securing permission-based software by reducing the attack surface: an application to Android", ACM, Proceedings of the 27th, 2012, pp. 274-277.*
Zhang et al, "Extending Android permission model and enforcement with user-defined runtime constraints", ACM, 2010, pp. 328-332.*

* cited by examiner

*Primary Examiner* — Luu Pham
*Assistant Examiner* — Ali Shayanfar
(74) *Attorney, Agent, or Firm* — Mintz Levin Cohn Ferris Glovsky and Popeo, P.C.; Kongsik Kim; Jonathon P. Western

(57) ABSTRACT

A method for operating an invisible system service on Android platform is disclosed. The method for operating system services on Android platform includes selectively registering a created system service in a context manager according to a type of the created system service, where the type of the system service comprises a first type for permitting access from an outside and a second type for not permitting access from the outside, and the selectively registering comprises registering in the context manager the created system service belonging to the first type and not registering in the context manager the created system service belonging to the second type.

2 Claims, 4 Drawing Sheets

① registers core platform services and managers information in the context manager (which serves as an agent)
② an application requests a service or manager of which use is desired
③ transfers the corresponding service or manager connection information
④ connects the application with the requested service through the binder

FIG. 2 (Prior Art)

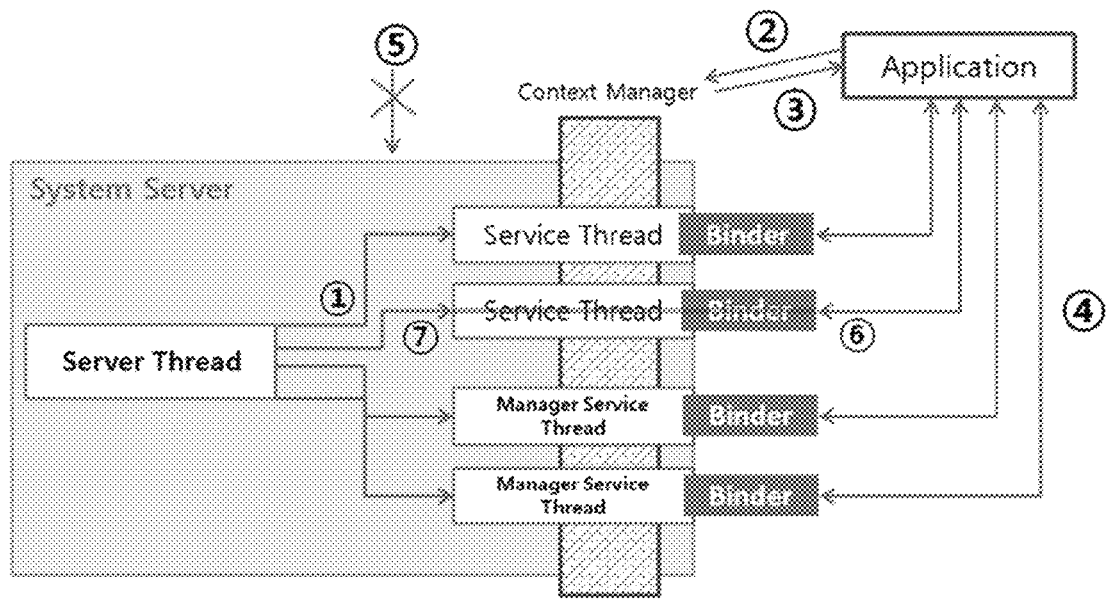

① generates and operates services & mangers in the form of threads
② an application requests a service or manager of which use is desired
③ transfers the corresponding service or manager connection information
④ each service communicates with the application through a prepared binder (access from the outside)
⑤ it is impossible to access the inside of the system server
⑥ vulnerable to risk of service termination using an error value during a service invocation
⑦ when an abnormal service termination is discovered, the system server reactivates and maintains the service

METHOD FOR OPERATING INVISIBLE SYSTEM SERVICES ON ANDROID PLATFORM

CROSS-REFERENCE TO RELATED APPLICATIONS

This application claims the benefit of Korean Patent Application No. 10-2012-0124778, filed with the Korean Intellectual Property Office on Nov. 6, 2012, the disclosure of which is incorporated herein by reference in its entirety.

TECHNICAL FIELD

Embodiments of the present invention relate to a method for operating invisible system services on Android platform that can prevent illegal access from the outside on Android platform.

RELATED ART

System services that operate on Android include hardware services, native system services, and core platform services.

Hardware services and native system services may control services related to the use of hardware equipment (e.g. audio, camera, touch panel, etc.), while core platform services may control services for actually operating the Android system (configuring the screen, controlling app execution, etc.).

On Android platform, a system service may be a program that supports various functions required by the Android platform, and herein refers to a program that is automatically created upon booting and is always running. Such a system service may be operated by a media server process and a system server process, where the system server may operate all core services, which control the operation of the Android platform, as well as certain high-priority native services which must always be running, such as touch recognition, etc.

FIG. 1 is a diagram for schematically illustrating the concept of system services on Android platform.

As illustrated in FIG. 1, in order to support remote invocation, the services operated in the system server may be registered in the context manager via a service manager, and binders may be generated for remote invocation. Application programs can be used by invoking the appropriate services using the binders.

The system server may generate and manage the system services in the form of child threads, and in the event of an error or an abnormal termination of a service, such as by a forced access termination, etc., the system service may be re-started to always ensure the operation of the service.

FIG. 2 is a diagram for schematically illustrating the concept of accessing system services on Android platform from the outside.

Referring to FIG. 2, when the system server executes core platform services in the form of threads, each service may be registered in the context manager through the service manager and may prepare a binder interface. Applications can request service functions and then use the service binders provided by the context manager to call and utilize the services.

The method of calling services through binders is to remotely access services and hence permits access from the outside. Thus, an example of misuse for this method may include forcibly terminating a service by creating a service error using a parameter value transmitted during a service call. A service can also be terminated by forcibly creating a thread interrupt.

As such, there is a need for a technique which ensures that a system service is kept running without permitting forced access from the outside.

SUMMARY

An aspect of the invention is to provide a method for operating invisible system services that can prevent illegal access from the outside on Android platform.

One aspect of the invention provides a method for operating system services on Android platform that includes selectively registering a created system service in a context manager according to a type of the created system service, where the type of the system service comprises a first type for permitting access from an outside and a second type for not permitting access from the outside, and the selectively registering comprises registering in the context manager a created system service belonging to the first type and not registering in the context manager a created system service belonging to the second type.

The method for operating system services on Android platform can further include selectively generating a binder for the created system service according to the type of the created system service, where the selectively generating can include generating a binder for the created system service belonging to the first type and not generating a binder for the created system service belonging to the second type.

The system service that belongs to the second type can be a manager service.

System services that belong to the second type can include a system service for detecting illegally-copied apps, a system service for organizing cache memory, a system service for collecting garbage, and the like.

Another aspect of the invention provides a method for operating system services on Android platform that includes selectively generating a binder for a created system service according to a type of the created system service, where the type of the system service comprises a first type for permitting access from an outside and a second type for not permitting access from the outside, and the selectively generating comprises generating a binder for the created system service belonging to the first type and not generating a binder for the created system service belonging to the second type.

Certain embodiments of the invention make it possible to prevent illegal access from the outside system services on Android-based system.

Additional aspects and advantages of the present invention will be set forth in part in the description which follows, and in part will be obvious from the description, or may be learned by practice of the invention.

BRIEF DESCRIPTION OF THE DRAWINGS

FIG. 2 is a diagram for schematically illustrating the concept of accessing system services from the outside on Android platform.

DETAILED DESCRIPTION

Figure 1:
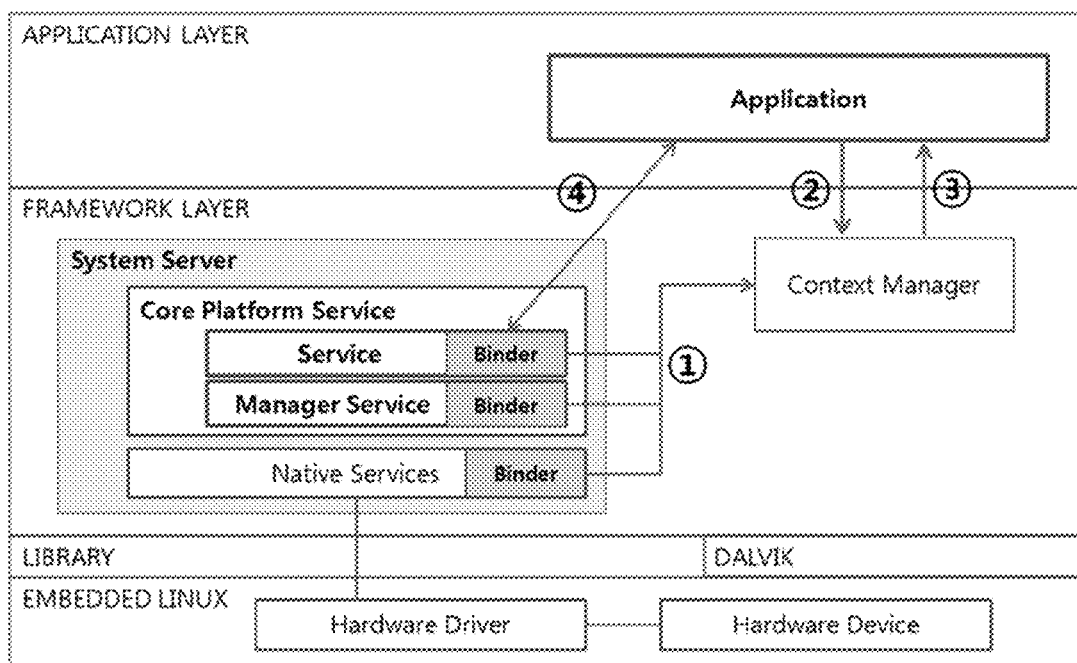
FIG. 1 is a diagram for schematically illustrating the concept of system services on Android platform.

As the present invention allows for various changes and numerous embodiments, particular embodiments will be illustrated in the drawings and described in detail in the written description. However, this is not intended to limit the invention to particular modes of practice, and it is to be appreciated that all changes, equivalents, and substitutes that do not depart from the spirit and technical scope of the invention are encompassed in the present invention. In describing the drawings, like reference numerals are used for like elements.

Certain embodiments of the invention will be described below in more detail with reference to accompanying drawings.

Figure 3:
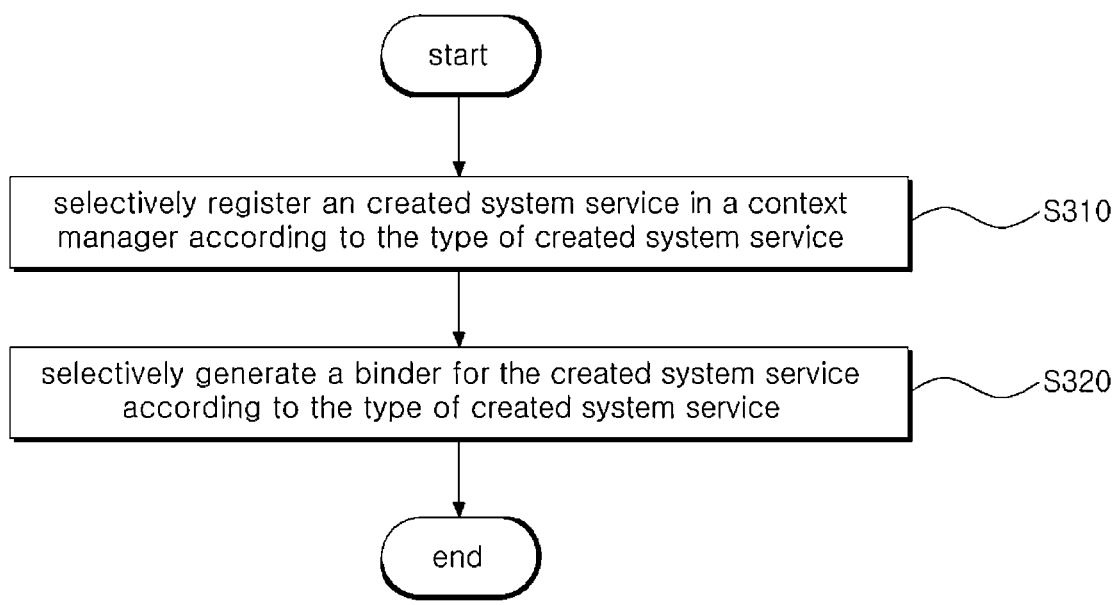
FIG. 3 is a flowchart illustrating the overall flow of a method for operating system services on Android platform according to an embodiment of the invention.

FIG. 3 is a flowchart illustrating the overall flow of a method for operating system services on Android platform according to an embodiment of the invention. Each of the steps illustrated in FIG. 3 can be performed by a processor within a terminal device having the Android operating system (OS) installed thereon.

The procedures performed for each step will be described below in more detail with reference to FIG. 3.

First, in step S310, system services created by the system server on the Android OS may be registered selectively in the context manager according to the types of the created system services.

Here, the system service types may include a first type and a second type.

More specifically, the system services of the first type may be system services that permit access from the outside (such as a general user of a smart device installed with the Android OS, for example). That is, a system service of the first type may be a typical, conventional system service created on the Android OS.

The system services of the second type may be system services that do not permit access from the outside (invisible system services), newly defined for the present invention.

The system services of the second type do not permit access from the outside, and the conventional system services (system services of the first type), on encountering a problem while running, may be recovered through the protection function of the server thread to ensure execution.

The system services of the second type can be added in the system server in the form of a module. Here, a module can mean hardware for implementing the technical spirit of the invention, as well as a functional, structural combination of software for activating the hardware. For instance, a person having ordinary skill in the field of art pertaining to the invention would easily appreciate that the module can mean a certain code and a logical unit of hardware resources for executing the code, and is not necessarily limited to physically connected code or a certain type of hardware.

Whether or not a system service is of the first type or the second type can be determined and classified by the system developer.

In an embodiment of the invention, the created system service may be registered in the context manager in step S310 if the created system service is a system service of the first type.

That is, if the created system service is of the first type, then access from the outside is permitted, and thus in step S310, the system service may be registered in the context manager so that the system service can be found in a search.

The procedures for registering the system service in the context manager are well known in the art and thus will not be described here in further detail.

In another embodiment of the invention, the created system service may not be registered in the context manager in step S310 if the created system service is a system service of the second type.

That is, if the created system service is of the second type, then access from the outside is not permitted, and thus in step S310, the system service may not be registered in the context manager. Accordingly, the system service may not be found in a search, and the user cannot ascertain whether or not the system service is currently created.

Continuing with the description of the method, in step S320, binders may be selectively generated, for system services created by the system server on the Android OS, according to the types of the created system services.

In an embodiment of the invention, a binder may be generated for the created system service in step S320 if the created system service is a system service of the first type.

That is, if the created system service is of the first type, then access from the outside is permitted, and thus in step S320, a binder may be generated for the system service, so as to allow remote invocation for the system service.

The procedures for generating the binder are also well known in the art and thus will not be described here in further detail.

In another embodiment of the invention, the binder may not be registered for the created system service in step S320 if the created system service is a system service of the second type.

That is, if the created system service is of the second type, then access from the outside is not permitted, and thus in step S320, there may be no binder generated for the system service. Accordingly, remote invocation may not be available for the system service, and the user cannot perform an action such as forced termination, etc., against the system service.

Although the descriptions above illustrate step S310 and step S320 being performed in said order, this is merely an example. In other examples, step S320 can precede step S310, or only one of step S310 and step S320 can be performed.

Figure 4:
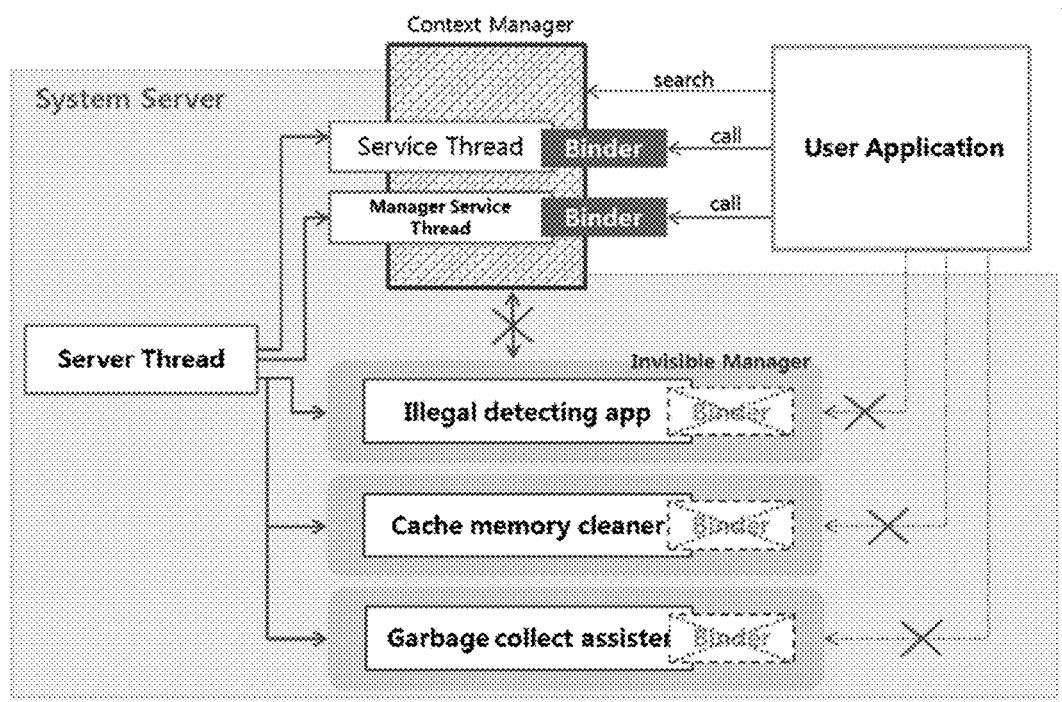
FIG. 4 is a diagram for schematically illustrating the concept of operating system services on Android platform according to an embodiment of the invention.

As described above, with a method for operating system services on Android platform according to an embodiment of the invention, a system service that should be protected from the outside (a system service of the second type) can be hidden and restricted from access, as the system service is not registered in the context manager or its binder is not generated. FIG. 4 schematically illustrates the concepts described above for generating the second type of system services and preventing access to them from the outside.

In an embodiment of the invention, a system service belonging to the second type (i.e. a system service to which access from the outside is not permitted) can be a manager service.

System services belonging to the second type can include system services for detecting illegally-copied apps, system services for organizing cache memory, system services for collecting garbage, and the like.

In particular, by adding an illegally-copied app detection module in the form of a second-type system service, it is possible to suppress the use of illegally-copied apps by preventing forced termination of the illegally-copied app detection module and ensuring proper execution, thereby increasing the transparency of the Android market and protecting the developers' credibility and copyrights.

As described above, the system services of the second type, having an invisible property, may offer the robustness of always ensuring that the system services are running, based on the self-recovery function of the system server. Also, unlike conventional system services on Android platform, there may be no remote invocation interface (i.e. binder) generated, thereby preventing outside access and protecting the system services. By utilizing the second type of system services having an invisible property, Android smart phone manufacturers can prevent user access and can easily add or operate system services that must be ensured to be always running.

The embodiments of the present invention can be implemented in the form of program instructions that may be performed using various computer means and can be recorded in a computer-readable medium. Such a computer-readable medium can include program instructions, data files, data structures, etc., alone or in combination. The program instructions recorded on the medium can be designed and configured specifically for the present invention or can be a type of medium known to and used by the skilled person in the field of computer software. Examples of a computer-readable medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc. Examples of the program of instructions may include not only machine language codes produced by a compiler but also high-level language codes that can be executed by a computer through the use of an interpreter, etc. The hardware mentioned above can be made to operate as one or more software modules that perform the actions of the embodiments of the invention, and vice versa.

While the present invention has been described above using particular examples, including specific elements, by way of limited embodiments and drawings, it is to be appreciated that these are provided merely to aid the overall understanding of the present invention, the present invention is not to be limited to the embodiments above, and various modifications and alterations can be made from the disclosures above by a person having ordinary skill in the technical field to which the present invention pertains. Therefore, the spirit of the present invention must not be limited to the embodiments described herein, and the scope of the present invention must be regarded as encompassing not only the claims set forth below, but also their equivalents and variations.

What is claimed is:

1. A method for operating system services performed by a processor of a terminal device, the method comprising:
    selectively registering, by the processor, executing an Android operating system, a created system service in a context manager according to a type of the created system service;
    selectively generating, by the processor, a binder for the created system service according to the type of the created system service;
    permitting access to a control of a system service from a user of the terminal device using a first type of the system service;
    prohibiting access to the control of the system service from a user of the terminal device using a second type of the system service, the system service belonging to the second type having an invisible property with respect to the user; and
    performing, using the second type of the system service, one or more of: detecting illegally-copied apps, organizing cache memory, and collecting garbage, wherein
    the selectively registering comprises registering in the context manager a created system service belonging to the first type and not registering in the context manager a created system service belonging to the second type, and
    the selectively generating comprises generating a binder for the created system service belonging to the first type and not generating a binder for the created system service belonging to the second type.

2. A non-transitory computer readable memory storing computer executable instructions that, when executed by a computing device, cause the computing device to perform the operations:
    selectively registering, by the processor, executing an Android operating system, a created system service in a context manager according to a type of the created system service;
    selectively generating, by the processor, a binder for the created system service according to the type of the created system service;
    permitting access to a control of a system service from a user of the terminal device using a first type of the system service;
    prohibiting access to the control of the system service from a user of the terminal device using a second type of the system service, the system service belonging to the second type having an invisible property with respect to the user; and
    performing, using the second type of the system service, one or more of: detecting illegally-copied apps, organizing cache memory, and collecting garbage, wherein
    the selectively registering comprises registering in the context manager a created system service belonging to the first type and not registering in the context manager a created system service belonging to the second type, and
    the selectively generating comprises generating a binder for the created system service belonging to the first type and not generating a binder for the created system service belonging to the second type.

* * * * *